Patented Feb. 25, 1936

2,031,938

UNITED STATES PATENT OFFICE 2,031,938

PROCESS FOR THE HALOGENATION OF ORGANIC FLUIDS

Richard M. Deanesly and George Hearne, Berkeley, Calif., assignors to Shell Development Company, San Francisco, Calif., a corporation of Delaware No Drawing. Application September 6, 1932, Serial No. 631,758

16 Claims. (Cl. 260—166)

The invention relates to improvements in the chlorination of organic liquids such as hydrocarbons, ketones, aldehydes, alcohols, esters and the like whereby the undesirable side reactions usually accompanying the main process may be substantially entirely eliminated, or greatly reduced in extent, thereby improving the yields of the desired end-products obtainable.

While our improved process is applicable to the chlorination of all organic compounds which can be handled in the liquid phase or in solutions of inert solvents of the character of carbon tetrachloride and the like in commercial apparatus, its advantages in the chlorination of unsaturated hydrocarbons, and particularly of olefine hydrocarbons containing a doubly bonded tertiary carbon atom, are easily demonstrated and explained. While describing the invention as applied to hydrocarbons in general and those of the tertiary olefine type in more detail, this method of presentation is not to be construed as narrowing its scope.

Saturated hydrocarbons of either chain or cyclic structure react with chlorine only to form substitution products i. e. compounds in which one or more atoms of chlorine take the places of corresponding hydrogen atoms of the original hydrocarbons. The hydrogen removed from the hydrocarbon forms hydrochloric acid gas with one-half of the chlorine.

Hydrocarbons of the olefine series may react in one of several ways. They may form substitution products like the saturated compounds, in which case the double bond remains intact and an unsaturated chlor-substituted hydrocarbon results. Or, they may form additional compounds, in which case, by the saturation of the double bond, saturated chlor-substituted hydrocarbons are formed. If the saturation takes place by the addition of two chlorine atoms, dichlorinated saturated hydrocarbons result, while monochlorinated saturated products are obtained by the taking up of one molecule of hydrochloric acid, formed by the reaction, by the double bond of the unattacked olefine.

The reactions mentioned are of the simplest type encountered in the chlorination of hydrocarbons. The mono- or di-chlorinated products may further react with free chlorine or with hydrochloric acid, resulting from the first substitution step, yielding more highly chlorinated compounds and, in general, these are formed pari passu with the less highly chlorinated ones. If the speed of reaction is not under sufficient control, the temperature in the reaction zone may rise to a point where orderly chlorination stops altogether, with the result that only hydrochloric acid and free carbon, in the form of soot, are found.

The reaction between one molecule of an unsaturated tertiary hydrocarbon or saturated hydrocarbon and one molecule (two atoms) of chlorine produces one molecule of monochlorinated hydrocarbon and one molecule of hydrochloric acid. If more chlorine is present in the reaction chamber under conditions conducive to chlorination, some compounds containing more than one chlorine atom in the molecule must be formed. If it is desired to form predominant quantities of monochlor compounds, the presence of such excess of chlorine must be avoided. For the purpose of this specification, the word "excess" will be construed to mean quantities of either organic compound or chlorine larger than required to form the desired chemical compound, plus, in the case of substitution, the accompanying hydrochloric acid. Similarly, the primary reaction product of a secondary olefine, as propylene, ethylene, alpha and beta butylene, amylenes other than tertiary amylene, etc., and chlorine always is the dichloride.

We have found that, avoiding an excess of chlorine is not in itself sufficient to prevent the formation of higher chlorinated products than desired. Evidently, to accomplish this it would be necessary to insure that no hydrocarbon molecule can come in contact with more free chlorine than it is desired to react with it. With the ordinary means now employed this cannot be accomplished. Therefore, we utilize a novel method for contacting the hydrocarbon with the chlorine gas.

For this purpose, we prefer to use an atomizing jet of the type in which a stream of gas or vapor is employed to subdivide a liquid into a spray of minute droplets. Such spraying devices are well known and used for the dispersion of perfumery, paints and the like, and need no further description.

In using such a spray, we employ the chlorine as the actuating gas, the dispersed liquid consisting partly or entirely of the organic liquid to be treated. Any jet-dispersion method may be used although we have obtained excellent results in spraying the chlorine through a body of surrounding organic liquid. By regulating the flow of gas and liquid, we obtain the proper proportions of reacting fluids and the method of operation of the atomizing jet insures that every droplet of liquid can come into contact only with a definite amount of unreacted chlorine gas.

A housing of suitable size and shape is built around the jet and spray and on the walls of this the liquid collects. Suitable outlets are provided through which the liquid and gaseous products are removed as later described. If the housing is shaped such that the flow of material from the jet onwards to the point of exit avoids contact between the wholly-reacted products and the partly-reacted mixture in the close neighborhood of the jet, more exact control of the chlorination process may be had as regards the end-products.

We prefer to operate the chlorinating process under such conditions that the reaction between the chlorine and the organic liquid is extremely rapid. This we achieve by providing in the neighborhood of the atomizing jet illumination of the required intensity. This may be either a window of a particular size and permeability for the admission of the right amount of sunlight, or a source of artificial radiation like an incandescent electric lamp, or other source of radiant energy. The intensity of illumination must be determined experimentally for every reaction. It is needless to say that, for reactions which are practically instantaneous in the dark, such as with unsaturated hydrocarbons or paraffin hydrocarbons in the presence of unsaturated hydrocarbons, the provision of a source of light becomes unnecessary.

By confining the reaction to a comparatively small space around the outlet of the jet, the total heat of the reaction is liberated in a very restricted volume and cooling by means ordinarily employed becomes impractical on account of the small area available to transfer the heat to external cooling media. To accomplish the required cooling, we add to the liquid containing the organic fluid a volatile agent of such vapor pressure characteristics that it volatilizes to a considerable extent below a temperature dangerously high for the reaction and at the pressure obtaining in the housing surrounding the reaction zone. In some cases, it may be desirable to add a volatile liquid unaffected by chlorine, like carbon tetrachloride, dichloro difluoro methane and the like, in others a hydrocarbon not acted upon under the conditions of chlorination, like propane or isobutane in reactions proceeding in the dark, while still in others, excess of the organic liquid to be chlorinated may be satisfactory.

The reaction having been carried out under the conditions described, it is now desirable to separate, as quickly as possible, the products present in the reaction chamber to avoid secondary reactions setting in. This is especially important if the primary products are chlor-substituted olefine hydrocarbons, as these have a tendency to form dichlor-substituted paraffins by the addition at the double bond of a molecule of hydrochloric acid, one of the products of the primary reaction.

For this purpose, we continuously permit the contents of the reaction zone to be displaced by the subsequently entering feed, or to be drained into a fractionating apparatus as described in copending application, Serial No. 487,196. As a matter of fact, we may elect to arrange the atomizing spray described in the foregoing, in the reaction zone of such a column. The dimensions of this column we determine in such a way that the various products of the reaction are separated from each other in less time than is required for secondary reactions to set in on a considerable scale and also choose the temperature and pressure conditions therein so as to retard such secondary reactions.

From the bottom of this column, we recover the chlorinated products which then may be further purified by fractionation. From the top product, which we may remove as a vapor, we separate the hydrochloric acid by suitable washing, and then, after drying, if necessary, we recover the cooling medium and/or unreacted organic fluid as liquids by cooling and/or compression. These we return to the reaction chamber. It is to be noted that at no time do we have free chlorine beyond the confines of the reaction chamber.

The striking advantages of our process are well demonstrated in the chlorination of olefine hydrocarbons containing a double bonded tertiary carbon atom, such as gamma butylene

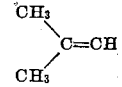

or the similarly constituted amylenes: unsymmetrical methyl-ethyl ethylene

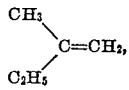

trimethylethylene

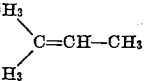

and the like. As a starting material for such chlorinations, we prefer to use liquids containing these tertiary hydrocarbons free from other hydrocarbons such as secondary butylenes, secondary amylenes, butanes, pentanes, etc., as it is desirable to avoid any unnecessary consumption of chlorine; the presence of the other hydrocarbons does not interfere with the desired reaction of the tertiary olefine, but leads merely to a mixture of the primary reaction products of each of the hydrocarbons present. It may be mentioned that the hydrocarbons such as the tertiary olefines may be obtained from the products of pyrolysis of mineral oils or other organic materials or may be derived by the decomposition of the corresponding alcohols, etc. With less pure starting materials, our results also excel those of other processes known at present, although further processes must be resorted to to separate the chlorides of other hydrocarbons from their admixture with the chloride of the tertiary olefine.

When dry tertiary olefines of this type are reacted with dry chlorine, substitution proceeds with a greater reaction velocity than addition, so that without excess chlorine the main products are unsaturated olefine monochlorides. These may be of two general types, according to the character of the carbon atom at which substitution occurs. If chlorine is substituted for one of the hydrogens of one of the saturated carbon atoms (those having no double bond) an isobutenyl or beta alkyl-substituted allyl type chloride results, while substitution at an unsaturated (double bonded) carbon atom results in a vinyl type chloride. At temperatures below 60° C. the formation of the allyl type of chloride proceeds at a preferential rate.

The hydrochloric acid formed by the substitution just described further reacts with the unsaturated hydrocarbons or with the unsaturated monochlorides by addition at the double bond. In this way saturated mono- or di-chlorides are formed as secondary reaction products. The rate of these secondary reactions is normally slower than that of the primary substitution, nevertheless they proceed to a considerable extent under conditions favoring them and results obtained by those working with known methods of chlorination indicate that some 35 to 50% of the chlorinated compounds obtained are products of these secondary reactions.

We have found that the rate of the addition of hydrochloric acid is accelerated by high temperature, by high pressure (high partial pressure of HCl) and to a certain extent by the presence of moisture in the reaction system.

On the basis of the foregoing, if we desire to chlorinate gamma butylene, as an example, and wish the substituted-allyl type monochloride—isobutenyl chloride—to be predominating product, we proceed as follows:

By means of the atomizing jet described, we establish intimate contact between gaseous chlorine and liquid gamma butylene, regulating the flow of gas and liquid so that the butylene is in excess. The butylene may be fed as a pure liquid or as a solution in other liquids and is kept at such temperature that it does not vaporize before reaching the outlet of the atomizing jet.

The explained action of the jet in preventing excess chlorine coming in contact with any particle of the liquid, and the feeding of an excess of gamma butylene insures that the primary reaction products will be predominately monochlorides.

To prevent secondary reactions with hydrochloric acid, we avoid high pressures in the reaction system and have found that at pressures substantially around atmospheric only a negligible amount of saturated chlorides is formed in the few seconds during which the products of the reaction are allowed to remain in contact with hydrochoric acid.

All material from the reaction zone flows, as soon as the reaction is complete, to a, preferably adjacent, fractionating column. In between the fractionating sections of this column, just above the point of entrance of the reaction product, an externally cooled heat exchange zone may be advantageously inserted if desired, whereby the reflux employed at the top of the column is minimized. Above and below this zone extend fractionating sections of suitable design. The chlorinated products having a boiling point of about 70° C., collect in the reboiling section connected to the lower end of the column, while the hydrochloric acid gas and vapors of gamma butylene issue from the top.

The dimensions of the upper fractionating section (above the feed zone), we select so that the vapors and gases traverse it in the shortest possible time in which it is possible to strip them of the relatively small amount of chlorinated vapors which accompany them. We have found it possible to accomplish this in 2 to 10 seconds although considerably longer time may be required in some cases.

From the stripped gases and vapors, we now remove the hydrochloric acid by scrubbing and condense the residual gamma butylene which, after drying, we preferably return to the process.

The chlorination of tertiary amylenes, hexylenes, etc., for the production of the corresponding unsaturated monochlorides may be carried out in an analogous manner.

A typical analysis of chlorinated products obtained from the chlorination of gamma butylene according to our process as described is the following:

|  | Mol. per cent |
|---|---|
| Isobutenyl chloride | 85 |
| Tertiary butyl chloride | 5 |
| Dichloro isobutane | 10 |

This shows that the primary chlorination reaction (substitution of chlorine into a saturated hydrocarbon radical) goes entirely in the desired direction. The tertiary butyl chloride and dichloroisobutane are formed by the secondary reaction of addition of hydrochloric acid to gamma butylene and to isobutenyl chloride.

As a recapitulation, we ascribe the excellent results obtained by our chlorination process to the following improvements:

Accurate proportioning of chlorine and organic liquid not only as to total quantities but extending to the smallest portion of the reacting mass through uniform distribution brought about by our method of contacting.

Prevention of overheating by instantaneous dissipation of reaction heat simultaneously and uniformly throughout the reacting mass through the evaporation of an internal cooling agent.

Inhibition of secondary reactions by the quick separation from each other of those products of the primary reaction which may further react with each other.

Prevention of products already chlorinated from reacting with additional chlorine as only unchlorinated products are fed to the reactor.

While we have described our process in its adaptation to the chlorination of hydrocarbons, it is equally well adapted to the chlorination of already partially chlorinated products or of other organic derivatives.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. In a process for the chlorination of an organic liquid, the step of atomizing said liquid within a chamber by means of a stream of chlorine gas and causing substantially all of the liquid product to flow as a film on the walls of the chamber.

2. In a process for the chlorination of an organic liquid, the steps of admixing with said liquid a volatile and substantially inert cooling agent, atomizing the mixture of said liquid and cooling agent within a chamber by means of a stream of chlorine gas and dissipating all or part of the heat liberated by the chlorination by evaporation of said cooling agent within the chamber.

3. In a process for the chlorination of an organic liquid, the steps of admixing with said liquid a volatile and substantially inert cooling agent, atomizing the mixture of said liquid and cooling agent within a chamber by means of a stream of chlorine gas, dissipating all or part of the heat liberated by the chlorination by evaporation of said cooling agent within the chamber and subsequently recovering said cooling agent.

4. In a process for the chlorination of an organic liquid, the steps of atomizing a mixture of said liquid and a volatile cooling agent by means of a stream of chlorine gas within a chamber, evaporating said cooling agent within said chamber, continuously transferring liquid and gaseous products from said chamber to a fractionating unit, separating said liquid and gaseous products and recovering from the latter said cooling agent.

5. In a process for the chlorination of an organic liquid, the steps of atomizing said liquid by means of a stream of chlorine gas, removing the primary products rapidly from the sphere of the reagent and returning to the zone of reaction unreacted material recovered from the primary products.

6. In a process for the chlorination of an organic liquid, the steps of atomizing said liquid by means of a stream of chlorine gas, removing the primary products rapidly from the sphere of the reagent, returning to the zone of reaction unreacted material recovered from the primary products and dissipating any surplus heat in the reaction zone by the introduction therein of a vaporizable liquid under vaporizing conditions.

7. In a process for the chlorination of an olefine in the liquid state, the step of atomizing said olefine by means of a stream of chlorine within a chamber and causing substantially all of the liquid product to flow as a film on the walls of the chamber.

8. In a process for the substantial production of unsaturated monochloride from tertiary olefine, the step of atomizing said tertiary olefine in the liquid state by means of a stream of chlorine within a chamber.

9. In a process for the chlorination of a hydrocarbon in the liquid state, the steps of admixing with said hydrocarbon a volatile and substantially inert cooling agent, atomizing the mixture of said liquid and cooling agent within a chamber by means of a stream of chlorine gas and dissipating all or part of the heat liberated by the chlorination by evaporation of said cooling agent within the chamber.

10. In a process for the substantial production of unsaturated monochloride from tertiary olefine in the liquid state, the steps of admixing with said olefine a volatile and substantially inert cooling agent, atomizing the mixture of said liquid and cooling agent within a chamber by means of a stream of chlorine gas and dissipating all or part of the heat liberated by the chlorination by evaporation of said cooling agent within the chamber.

11. In a process for the substantial production of unsaturated monochloride from tertiary olefine in the liquid state, the steps of atomizing an excess of said liquid within a chamber by means of a stream of chlorine gas and dissipating all or part of the heat liberated by the chlorination by evaporation of part of said liquid within the chamber.

12. In a process for the chlorination of a hydrocarbon in the liquid state, the steps of atomizing said liquid by means of a stream of chlorine gas, removing the primary products rapidly from the sphere of the reagent and returning to the zone of reaction unreacted material recovered from the primary products.

13. In a process for the chlorination of a hydrocarbon in the liquid state, the steps of atomizing said liquid by means of a stream of chlorine gas, removing the primary products rapidly from the sphere of the reagent, returning to the zone of reaction unreacted material recovered from the primary products and disspating any surplus heat in the reaction zone by the introduction therein of a vaporizable liquid under vaporizing conditions.

14. In a process for the chlorination of an organic liquid, the steps which comprise atomizing said liquid by means of a stream of chlorine gas within a chamber in the intimate presence of an inert cooling agent which vaporizes at about the chlorination temperature and pressure in said chamber.

15. In a process for the chlorination of an organic liquid, the steps of maintaining a single reaction zone in a fractionating column, atomizing the organic liquid into said reaction zone by means of a stream of chlorine, and simultaneously effecting rapid and substantially complete separation of reacted and unreacted products by fractionation in said column above and below said reaction zone.

16. In a process for the chlorination of a hydrocarbon in the liquid state, the steps of maintaining a single reaction zone in a fractionating column, atomizing the liquid hydrocarbon into said reaction zone by means of a stream of chlorine, and simultaneously effecting rapid and substantially complete separation of reacted and unreacted products by fractionation in said column above and below said reaction zone.

RICHARD M. DEANESLY.
GEORGE HEARNE.